July 25, 1939.    J. J. TIPCKE    2,167,595
GROUND PULVERIZER
Filed June 25, 1938    2 Sheets-Sheet 1
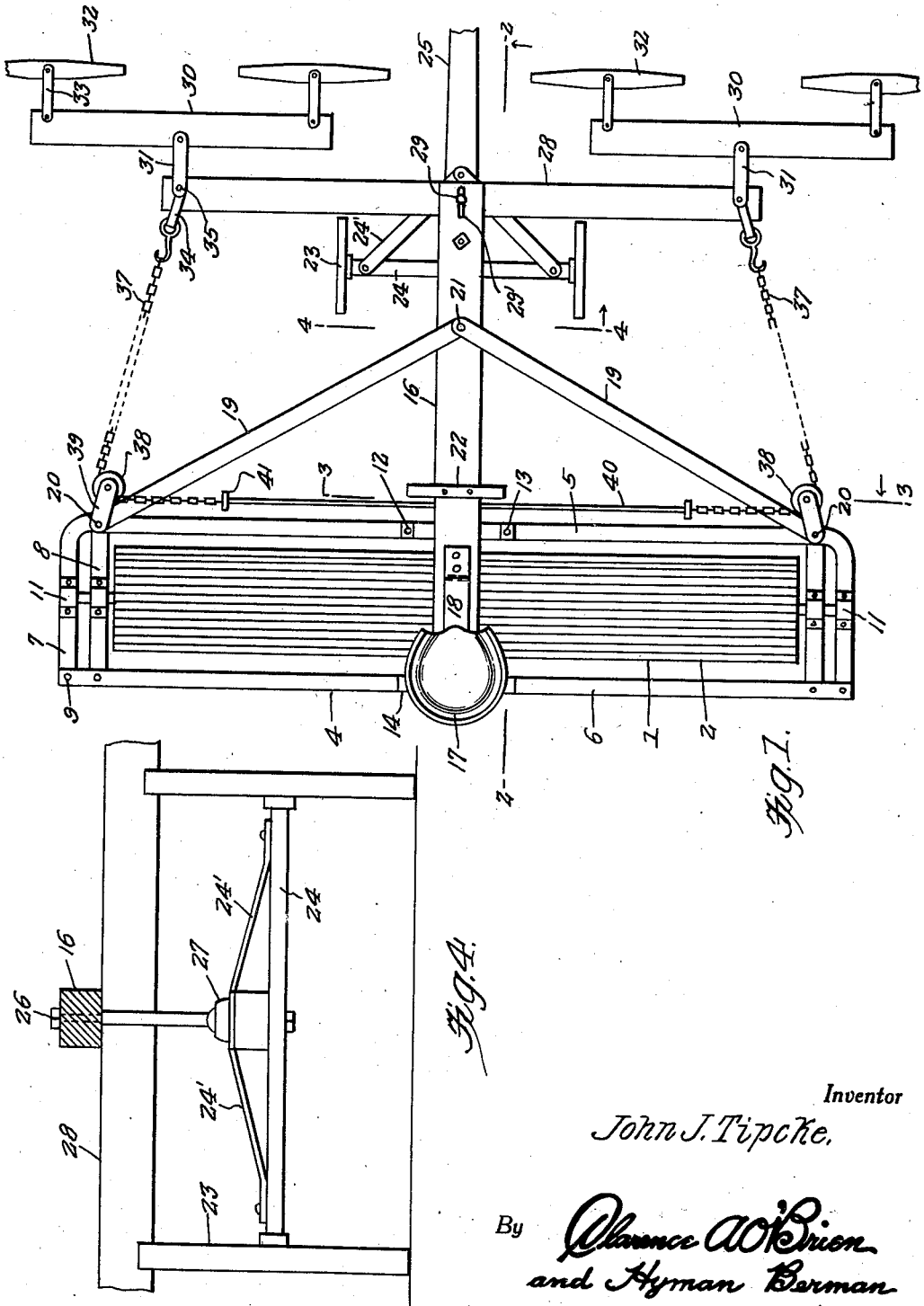
Inventor
John J. Tipcke,
By Clarence A. O'Brien
and Hyman Berman
Attorneys July 25, 1939.   J. J. TIPCKE   2,167,595
GROUND PULVERIZER
Filed June 25, 1938    2 Sheets—Sheet 2
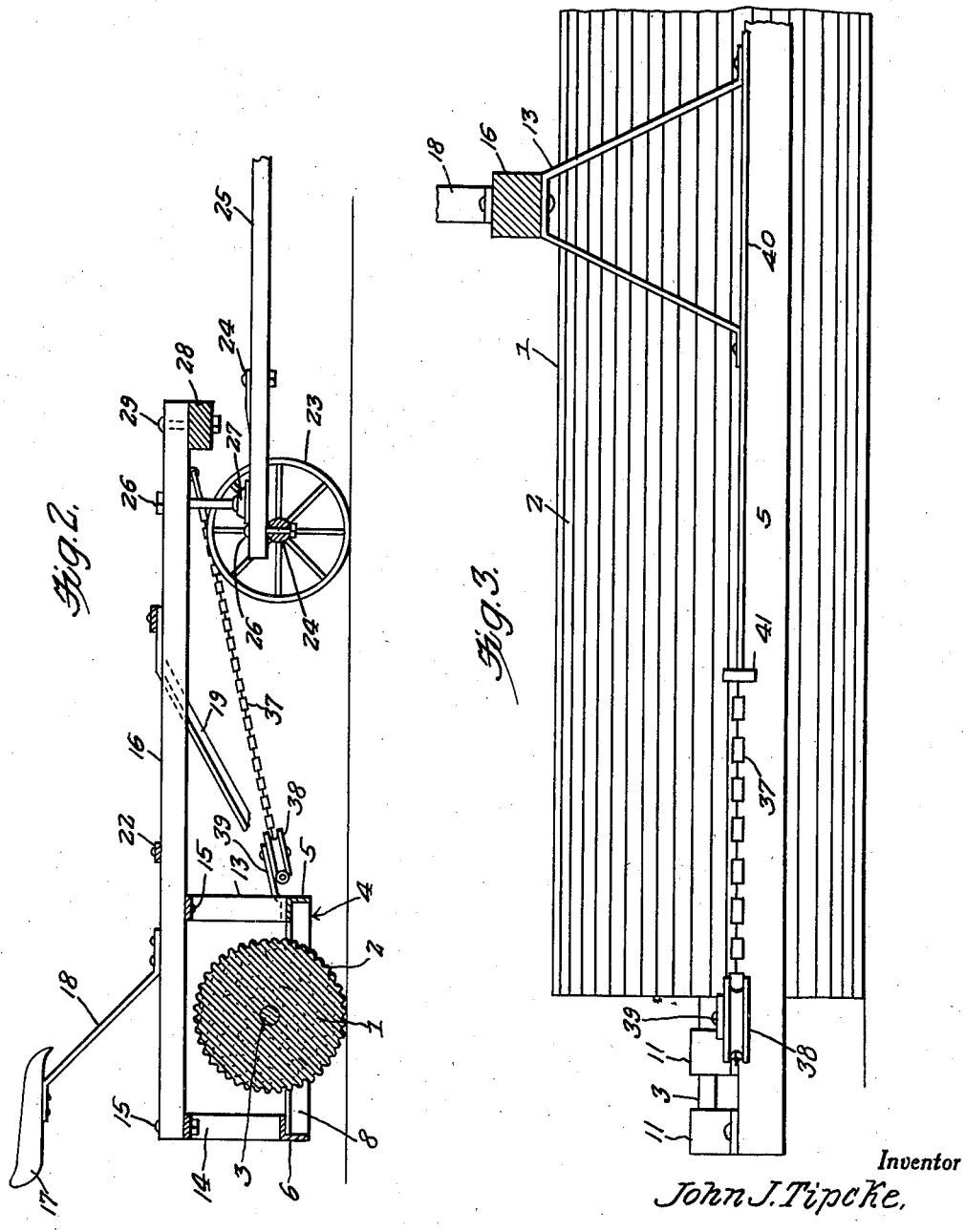
Inventor
John J. Tipcke,
By Clarence A. O'Brien
and Hyman Berman
Attorneys Patented July 25, 1939

2,167,595

UNITED STATES PATENT OFFICE 2,167,595

GROUND PULVERIZER

John J. Tipcke, Lake City, Minn.

Application June 25, 1938, Serial No. 215,894

1 Claim. (Cl. 55—21)

My invention relates to improvements in ground pulverizing and packing implements of the horse-drawn type and the object in view is to provide an efficient implement for breaking up ploughed ground and packing and rolling the same and which is equipped for harnessing two teams of draft animals thereto and to be easily turned around within a limited space.

Other and subordinate objects will presently appear when the succeeding description and claim are read with references to the drawings accompanying and forming part of this specification.

In said drawings:

Figure 1 is a view in top plan of a pulverizing and packing implement constructed in accordance with my invention, Figure 2 is a view in longitudinal section taken on the line 2—2 of Fig. 1 looking in the direction indicated by the arrows, Figure 3 is a fragmentary view in transverse section taken on the line 3—3 of Fig. 1 looking rearwardly of the implement as indicated by the arrows and drawn to an enlarged scale, and Figure 4 is a view in transverse section taken on the line 4—4 of Fig. 1 looking forwardly as indicated by the arrows and drawn to an enlarged scale, Referring to the drawings by numerals, the implement of my invention comprises an elongated ground roller 1 of concrete, or cement, having a longitudinally corrugated periphery 2 and an axial shaft 3 extending therethrough and projecting for a short distance beyond the opposite ends thereof. The projecting ends of the shaft 3 support a rectangular frame 4 surrounding the roller 1 and comprising front and rear bars 5 and 6, outer end bars 7, and inner end bars 8, all preferably of angle iron suitably secured together, as indicated at 9, the end bars 8 and 9 having suitably secured thereto cap bearings 11 in which the projecting ends of shaft 3 are journalled.

The front and rear bars 5 and 6 have bolted thereto, as is shown in Fig. 2, a pair of front and rear brackets 13 and 14 of flat metal and inverted U-shaped upstanding from said bars for a suitable distance above the top of the roller 1 and to which is suitably secured, as at 15, the rear end of a draft beam 16, preferably of wood, and extending forwardly of the frame 4 for a short distance. A suitable seat 17 is supported by the usual spring standard 18 arising from the beam 16 adjacent the rear end thereof. A pair of forwardly converging tie bars 19 extend forwardly from the front frame bar 5, adjacent the ends of the frame 4, to the beam 16 and are suitable connected to said bar, as by bolt 20, and to said beam 16, as at 21, forwardly of the frame 4. A bar-like foot rest 22 is suitably secured to the beam 16 in front of the standard 18.

The front end of the beam 16 is supported by a narrow gauge steering truck comprising a pair of small ground wheels 23 rotatable on opposite ends of the short axle bar 24. A draft tongue 25 is secured at its rear end to the axle bar 24 centrally thereof by a bolt 26. A pair of forwardly converging tie bars 24' are secured to the axle bar 24 adjacent the opposite ends thereof and to the tongue 25 in any suitable manner. The described truck is pivotally connected to the beam 16 by means of a king bolt 26 fixed at its upper end against endwise movement in said beam to depend therefrom and having its lower end seated in a socket plate 17 suitably secured to the tongue 25 slightly in advance of the axle bar 24, said king bolt being spaced rearwardly of the front end of beam 16 for a substantial difference.

A draft bar 28 is pivoted midway of its ends on the front end of the beam 16, in front of the king bolt 26 by means of a bolt 29, said bolt sliding in a longitudinal slot 29' in said beam 16. A pair of double trees 30 are secured to the opposite ends of the draft bar 28 by the usual pivoted links 31. A pair of single trees 32 are similarly secured to each double tree by links 33 at opposite ends thereof respectively.

Extending rearwardly from the opposite ends of the draft bar 28 is a pair of clevises 34 pivotally connected to said double tree as at 35 and in which are freely mounted a pair of hooks 36. A pair of chains 37 are connected at one end to said hooks 36 and trained around a pair of sheaves 38 swingably mounted on the front bar 5 adjacent the opposite ends of the frame 4 by laterally swingable links 39 pivoting on the before mentioned bolts 20. The other ends of the chains 37 are connected in any suitable manner to a draft rod 40 floating between the sheaves 38 and having heads 41 on the opposite ends thereof, the arrangement being such that when the draft is equalized, as between the team, the draft rod 40 is centered between the sheaves 38 with the heads 41 spaced equidistantly inwardly from said sheaves, but, when the draft is not equalized said rod is pulled to one side, thereby advising the driver that such condition obtains and needs correction.

As will be clear in the event that one team is doing all the pulling the head 41 on the side of this team will engage the adjacent sheave 38 and the chain 37 on the other side will become slack thus the driver will be advised of this condition. Under equal draft, or equalized draft, the pull is directed against opposite ends of the frame 4 thus relieving the tongue 25 and beam 16 of side strain. The heads 41 of rod 40 engage the sheaves 38 for facilitating turning of the implement around.

By making the roller 1 of corrugated concrete, or cement, a heavy, cheap and practically indestructible ground working element is provided and which thoroughly pulverizes and packs the earth.

The foregoing will, it is believed, suffice to impart a clear understanding of my invention without further explanation.

Manifestly the invention, as described, is susceptible of modification without departing from the inventive concept and right is herein reserved to all such modifications falling within the scope of the subjoined claim.

What is claimed is:

In an implement of the class described, an elongated roller having trunnions extending from opposite ends thereof, a rectangular frame surrounding said roller and having end bars on which said trunnions are journalled, said frame comprising front and rear bars, respectively, a pair brackets upstanding from said bars, respectively, in the center thereof and extending above said roller, a draft beam secured to said brackets and extending forwardly of the frame, a truck supporting the front end of said beam and pivoted thereon to trail behind said pivot, a draft tongue extending forwardly of said truck, a draft bar pivoted midway of its ends on the front end of said beam, the latter being slotted longitudinally to receive said pivot, a pair of sheaves connected to said front bar adjacent opposite ends of the frame, a pair of chains having front ends secured to opposite ends of said draft bar and their rear ends trained around said sheaves, and a rod intermediate said sheaves and to the opposite end of which said rear ends of the chain are connected, said rod having headed ends adapted to engage said sheaves under unequal draft on opposite ends of said draft bar respectively, and said chains, sheaves and rods preventing forward movement of the pivot of the draft bar in the slot of said beam.

JOHN J. TIPCKE.